United States Patent
Nakano (10) Patent No.: US 9,707,902 B2
(45) Date of Patent: Jul. 18, 2017

(54) COMMUNICATION SYSTEM, IN-VEHICLE APPARATUS, AND PROGRAM PRODUCT

(71) Applicant: DENSO CORPORATION, Kariya, Aichi-pref. (JP)

(72) Inventor: Yoshihisa Nakano, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/901,680

(22) PCT Filed: Jun. 23, 2014

(86) PCT No.: PCT/JP2014/003348
§ 371 (c)(1),
(2) Date: Dec. 28, 2015

(87) PCT Pub. No.: WO2015/001760
PCT Pub. Date: Jan. 8, 2015

(65) Prior Publication Data
US 2016/0280149 A1    Sep. 29, 2016

(30) Foreign Application Priority Data
Jul. 2, 2013   (JP) ................. 2013-138887

(51) Int. Cl.
*G06F 21/00*  (2013.01)
*B60R 11/02*  (2006.01)
(Continued)

(52) U.S. Cl.
CPC .......... *B60R 11/0235* (2013.01); *H04M 1/04* (2013.01); *H04M 1/6091* (2013.01);
(Continued)

(58) Field of Classification Search
None
See application file for complete search history.

(56) References Cited

U.S. PATENT DOCUMENTS

| 5,859,628 A | * | 1/1999 | Ross et al. | ................. 345/173 |
| 2003/0156097 A1 | | 8/2003 | Kakihara et al. | |

(Continued)

FOREIGN PATENT DOCUMENTS

| CN | 1027743360 A | 11/2012 |
| JP | 2003244343 A | 8/2003 |

(Continued)

OTHER PUBLICATIONS

International Search Report and Written Opinion (in Japanese with English Translation) for PCT/JP2014/003348, mailed Aug. 5; 2014; ISA/JP.

*Primary Examiner* — Brent Swarthout
(74) *Attorney, Agent, or Firm* — Harness, Dickey & Pierce, P.L.C.

(57) ABSTRACT

A communication system includes an in-vehicle apparatus, a portable information terminal, and a communication auxiliary apparatus that assists communication between the in-vehicle apparatus and the portable information terminal. The communication auxiliary apparatus is provided in a vehicle compartment, and includes a proximity wireless I/F part and a concavity. The proximity wireless I/F part is connected to the in-vehicle apparatus, receives data transmitted from the portable information terminal by proximity wireless communication, and also transmits data received from the in-vehicle apparatus to the portable information terminal by the proximity wireless communication. The concavity holds the portable information terminal and enables the proximity wireless communication with the proximity wireless I/F part. The portable information terminal restricts executable applications when the proximity wireless communication with the proximity wireless I/F part is being performed.

12 Claims, 6 Drawing Sheets

(51) Int. Cl.
*H04M 1/04* (2006.01)
*H04M 1/60* (2006.01)
*H04W 4/00* (2009.01)
*H04W 8/22* (2009.01)
*B60R 11/00* (2006.01)

(52) U.S. Cl.
CPC ............ *H04W 4/008* (2013.01); *H04W 8/22* (2013.01); *B60R 2011/0005* (2013.01); *B60R 2011/0075* (2013.01); *B60R 2011/0078* (2013.01); *H04M 2250/04* (2013.01)

(56) References Cited

U.S. PATENT DOCUMENTS

| 2011/0105198 | A1 | 5/2011 | Grivas et al. | |
|---|---|---|---|---|
| 2011/0263293 | A1* | 10/2011 | Blake | B60K 35/00 455/557 |
| 2012/0289215 | A1 | 11/2012 | Elliott et al. | |
| 2012/0303177 | A1* | 11/2012 | Jauch | G08C 17/02 701/1 |
| 2014/0189801 | A1* | 7/2014 | Rokusek | G06F 21/00 726/4 |

FOREIGN PATENT DOCUMENTS

| JP | 2004224204 A | 8/2004 |
|---|---|---|
| JP | 2004310451 A | 11/2004 |
| JP | 2007251669 A | 9/2007 |
| JP | 2010163114 A | 7/2010 |
| JP | 2012124578 A | 6/2012 |
| JP | 2012214087 A | 11/2012 |
| JP | 2013135375 A | 7/2013 |

\* cited by examiner

Electric field strength versus distance

COMMUNICATION SYSTEM, IN-VEHICLE APPARATUS, AND PROGRAM PRODUCT

CROSS REFERENCE TO RELATED APPLICATIONS

This application is a U.S. National Phase Application under 35 U.S.C. 371 of International Application No. PCT/JP2014/003348 filed on Jun. 23, 2014 and published in Japanese as WO 2015/001760 A1 on Jan. 8, 2015. This application is based on and claims the benefit of priority from Japanese Patent Application No. 2013-138887 filed on Jul. 2, 2013. The entire disclosures of all of the above applications are incorporated herein by reference.

TECHNICAL FIELD

The present disclosure relates to a communication system employing a vehicular communication auxiliary apparatus that assists communication between an in-vehicle apparatus and a portable information terminal, an in-vehicle apparatus, and a program product that is installed in an in-vehicle apparatus and a portable information terminal.

BACKGROUND ART

Patent Literature 1 proposes an information display system that displays contents displayed on a display unit of a portable information terminal on a display unit of an in-vehicle apparatus.

In this information display system, a control unit included in the portable information terminal also supplies information displayed on the display unit of the portable information terminal to the in-vehicle apparatus through an interface. Furthermore, the control unit of the portable information terminal supplies manipulation command data of the portable information terminal to the in-vehicle apparatus through the interface. Thereby, the manipulation command of the portable information terminal is displayed on the display unit of the in-vehicle apparatus; the in-vehicle apparatus also functions as a manipulation part of the portable information terminal.

PRIOR ART LITERATURES

Patent Literature

Patent Literature 1: JP 2003-244343 A

SUMMARY OF INVENTION

In Patent Literature 1, double investment is required in hardware: one is for the display unit of the in-vehicle apparatus, and the other is for the display unit of the portable information terminal. To avoid such double investment, the display unit of the portable information terminal may be used as the display unit of the in-vehicle apparatus; this may distract driver's attention depending on a setting position of the display unit of the portable information terminal in the vehicle compartment. Moreover, when taking over the function of the in-vehicle apparatus, the portable information terminal needs to be in a use status suitable for manipulation in the vehicle.

The present disclosure has a main object to configure the portable information terminal to be in a use status suitable for manipulation in the vehicle while inhibiting the driver from distracting his/her attention in view of the above-mentioned actual circumstances.

To achieve the object, according to an example of the present disclosure, a communication system is provided to include an in-vehicle apparatus, a portable information terminal, and an auxiliary apparatus for vehicular communication. The in-vehicle apparatus is connected to a plurality of instruments of a vehicle. The portable information terminal is capable of executing a plurality of applications. The auxiliary apparatus assists communication between the in-vehicle apparatus and the portable information terminal. The auxiliary apparatus includes a communication part and a holding part. The communication part is connected to the in-vehicle apparatus, and is capable of receiving data transmitted from the portable information terminal by proximity wireless communication and transmitting data from the in-vehicle apparatus to the portable information terminal by the proximity wireless communication. The holding part is provided in a compartment of the vehicle, holds the portable information terminal, and enables the proximity wireless communication between the portable information terminal that is held and the communication part. The portable information terminal restricts an executable application to a predetermined application on condition that the portable information terminal is held in the holding part and is performing the proximity wireless communication with the communication part.

This configuration enables the communication part to receive data transmitted from the portable information terminal by proximity wireless communication and, simultaneously, enables data to be transmitted from the in-vehicle apparatus to the portable information terminal through the communication part by the proximity wireless communication. The proximity wireless communication, which is typically used just for a while of temporarily holding, now needs to be performed continuously in a moving vehicle; this requires the portable information terminal to be fixed in the vehicle. Furthermore, reducing the driver distraction requires the portable information terminal to be fixed in a predetermined place in a vehicle compartment.

A holding part is provided in the vehicle compartment to hold the portable information terminal and enable the proximity wireless communication between the portable information terminal that is held and the communication part. When the portable information terminal is held in the holding part and is performing the proximity wireless communication with the communication part, an executable application is restricted to a predetermined application.

Only in the case where the portable information terminal is held in the holding part in the vehicle compartment, one-to-one stable proximity wireless communication is performed between the in-vehicle apparatus and the portable information terminal limiting the executable application. Accordingly, the portable information terminal can be made in the use status suitable for the manipulation in the vehicle, while inhibiting the driver from distracting the attention. Since the in-vehicle apparatus and the portable information terminal are connected by the proximity wireless communication, unlike the case where the both are connected by wireless communication other than proximity wireless communication or by cable communication, the portable information terminal is unused in any place other than the predetermined holding part, eliminating a risk for driver distraction.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Hereinafter, each embodiment having embodied a communication system that includes a communication auxiliary apparatus to assist communication between the in-vehicle apparatus connected to various units of the vehicle and the portable information terminal will be explained, referring to drawings. Among following respective embodiments, an identical reference numeral is given to the same or equal portion in diagrams, and the explanation shall be applied for the portion of the identical reference numeral.

First Embodiment

Figure 1:
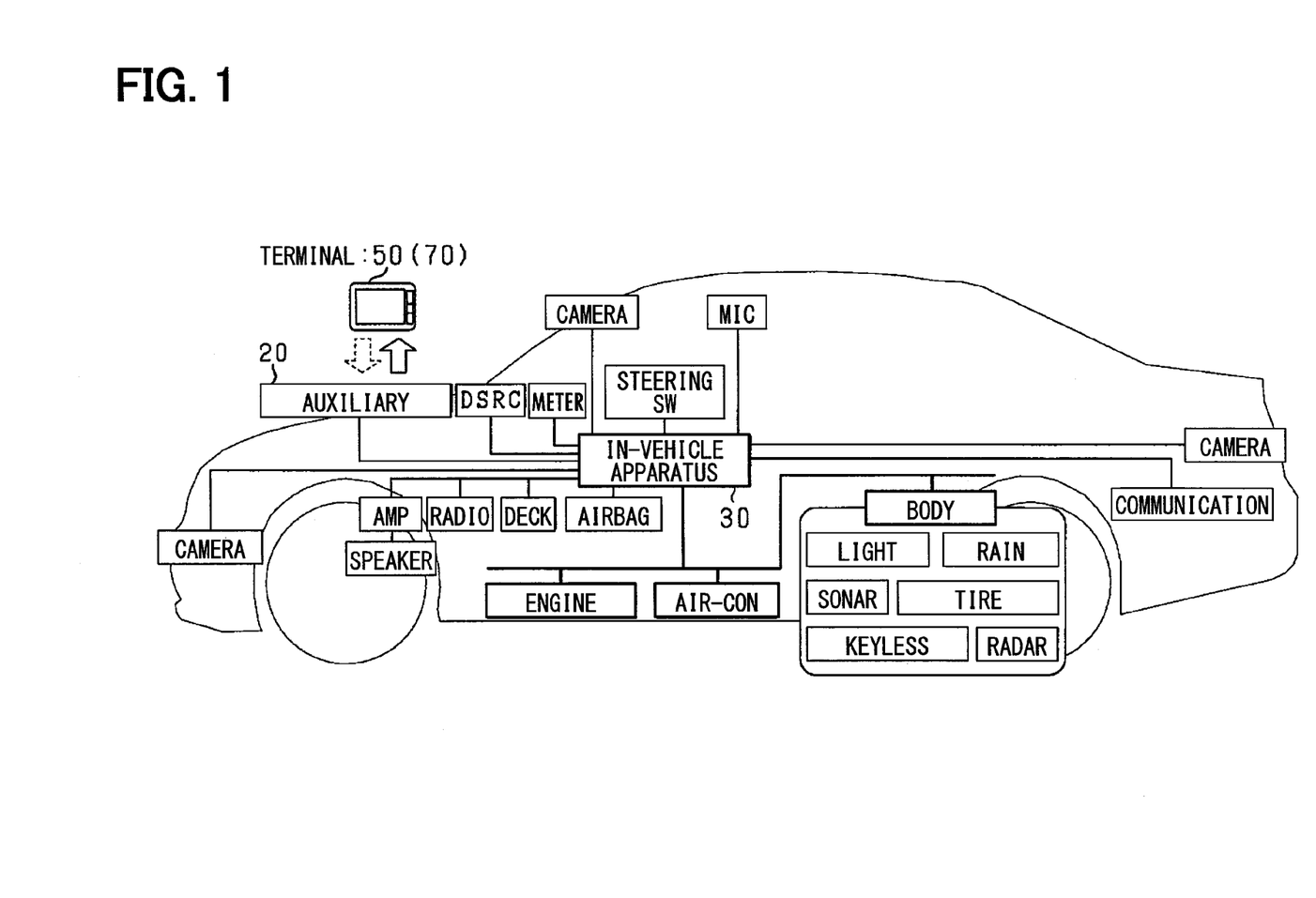
FIG. 1 is a block diagram of an overall communication system.

With reference to FIG. 1, an overall configuration of the communication system according to each embodiment will be explained. This communication system includes: an in-vehicle apparatus 30 that is connected (i.e. electrically connected) to various in-vehicle instruments (various instruments) or capable of communicating with the various in-vehicle instruments; a portable information terminal 50 (70) capable of executing multiple applications; and a communication auxiliary apparatus 20 (communication auxiliary apparatus for vehicle) that is connected to the in-vehicle apparatus 30 and performs proximity wireless communication between the in-vehicle apparatus 30 and the portable information terminal 50. Applications for vehicle (predetermined applications) that have been certified by a vehicle manufacturer or another organization are installed in the portable information terminal 50 that is connected to the in-vehicle apparatus 30 through the communication auxiliary apparatus 20. The applications for vehicle include an application that manipulates the various in-vehicle instruments, and an application that displays information of the vehicle on a screen of the portable information terminal 50 as a screen image (or a display window).

The in-vehicle apparatus 30 receives various data such as image data taken by an in-vehicle camera and detected data detected by various sensors from various instruments, and transmits the received various data to the portable information terminal 50 through the communication auxiliary apparatus 20. Moreover, the in-vehicle apparatus 30 receives a control command bound for various control instruments from the portable information terminal 50 through the communication auxiliary apparatus 20, and transmits the received control command to the various control instruments.

The portable information terminal 50 displays and stores various data received from the communication auxiliary apparatus 20 by executing an application that displays the information of the vehicle on the screen. Moreover, the portable information terminal 50 transmits the control command bound for the various in-vehicle instruments to the in-vehicle apparatus 30 through the communication auxiliary apparatus 20 in response to manipulation of the portable information terminal 50 by a user by executing applications that perform the manipulation of the various in-vehicle instruments. General applications (e-mail software, music replay software, and game software) that the user selected according to their liking in addition to the above-mentioned applications for vehicle are installed in the portable information terminal 50.

Figure 2:
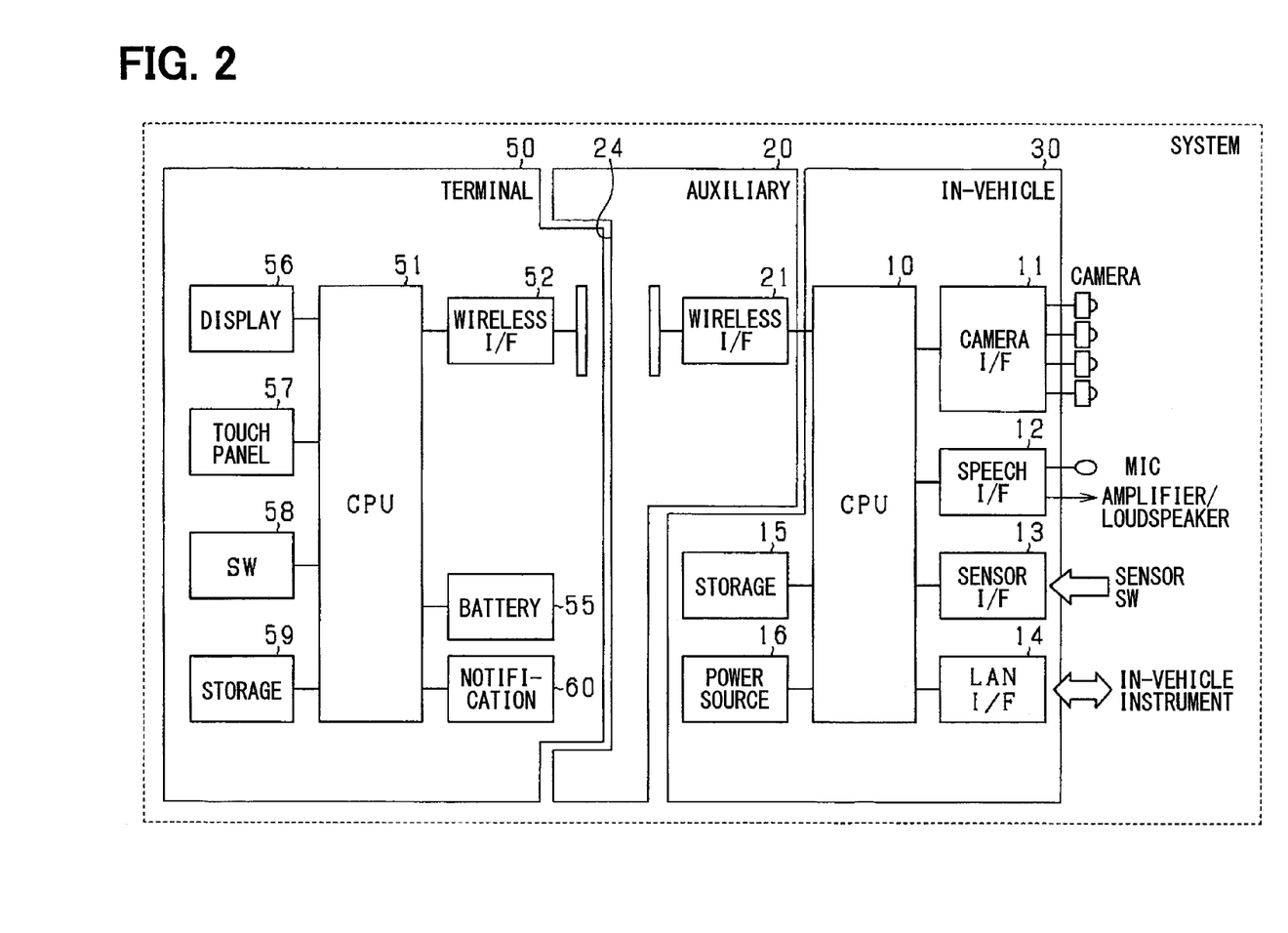
FIG. 2 is configuration diagrams of a communication auxiliary apparatus, an in-vehicle apparatus, and a portable information terminal according to a first embodiment.

With reference to FIG. 2, specific configurations of the communication auxiliary apparatus 20, the in-vehicle apparatus 30, and the portable information terminal 50 according to the first embodiment will be explained.

The in-vehicle apparatus 30 includes a CPU 10, an I/F part for camera 11, a speech processing I/F part 12, an in-vehicle sensor I/F part 13, a vehicular LAN I/F part 14, an information storage unit 15, and a power source unit 16.

The CPU 10 is connected with the various in-vehicle instruments through various I/F parts and is also connected to the communication auxiliary apparatus 20. The CPU 10 controls the various in-vehicle instruments and also performs transmission and reception of data with the portable information terminal 50 through the communication auxiliary apparatus 20.

The I/F part for camera 11 connects the in-vehicle camera mounted in the front part of or in the rear part of the vehicle compartment, transmits the control command from the CPU 10 to the in-vehicle camera, and also transmits image data from the in-vehicle camera to the CPU 10. The speech processing I/F part 12 connects a microphone, a speaker mounted on the vehicle, and the CPU 10, transmits speech data inputted into the microphone to the CPU 10, and also transmits the speech data from the CPU 10 to the speaker.

The in-vehicle sensor I/F part 13 connects various sensors mounted on the vehicle and the CPU 10, and transmits the detected data detected by the various sensors from the various sensors to the CPU 10. The various sensors include a vehicle speed sensor and a residual fuel level sensor. The in-vehicle sensor I/F part 13 transmits vehicle speed information acquired by the vehicle speed sensor and residual fuel level information acquired by the residual fuel level sensor to the CPU 10. Moreover, the in-vehicle sensor I/F part 13 connects various switches installed in the vehicle and the CPU 10, and transmits manipulation information of the various switches to the CPU 10 from the various switches.

The vehicular LAN I/F part 14 connects the various control instruments, such as an air-conditioning control instrument, a body control instrument, an engine control instrument, and a meter, with the CPU 10, and transmits/receives data between the various control instruments and the CPU 10. For example, when the CPU 10 receives manipulation information of a switch of an air-conditioner from the in-vehicle sensor I/F part 13, the CPU 10 transmits the control command to the air-conditioning control instrument through the vehicular LAN I/F part 14. Then, the control command is transmitted from the air-conditioning control instrument to the air-conditioner; when the air-conditioner has executed the control command, completion of execution is notified to the CPU 10 from the air-conditioning control instrument through the vehicular LAN I/F part 14. Moreover, setting states, such as a temperature at the time of use of the air-conditioner and an air flow rate, are transmitted from the air-conditioning control instrument to the CPU 10 through the vehicular LAN I/F part 14.

The information storage unit 15 stores various programs executed by the CPU 10 and various data received by the CPU 10. For example, the information storage unit 15 stores the vehicle speed information and the residual fuel level information transmitted from the in-vehicle sensor I/F part 13, and a total mileage calculated from the vehicle speed information. Moreover, the information storage unit 15 stores a setting state at the time of use of the air-conditioner transmitted from the vehicular LAN I/F part 14, furthermore storing maintenance information of the vehicle, such as oil change time, regular checkup time, and filter exchange time. The power source unit 16 supplies electric power to the CPU 10.

The communication auxiliary apparatus 20 includes a proximity wireless I/F part 21 (a communication part) and a concavity 24 that is provided in the vehicle compartment and capable of holding the portable information terminal 50.

Figure 3:
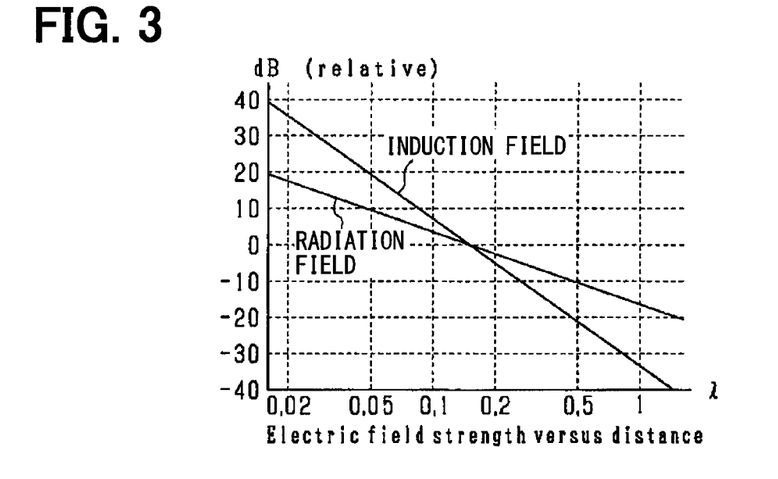
FIG. 3 is a diagram illustrating a relationship between a distance and field intensities of an induction field and a radiation field.

The proximity wireless I/F part 21 is a wireless interface that performs the proximity wireless communication using an induction field mode such as Transfer Jet (registered trademarks: ISO/IEC 17568, ISO/IEC 17569). As in FIG. 3, attenuation of an induction field with respect to distance is larger than that of a radiation field. Assuming that a frequency of carrier waves is 5 GHz (its wavelength is about 60 mm), a communication distance enabling the proximity wireless communication with the proximity wireless I/F part 21 is set within about 1 cm. The use of the proximity wireless communication can thus limit a communicatable place to the proximity of the interface of the proximity wireless communication.

The proximity wireless I/F part 21 is disposed in the proximity of the concavity 24. The concavity 24 thus enables the proximity wireless communication between the portable information terminal 50 held in the concavity 24 and the proximity wireless I/F part 21. By contrast, unless the portable information terminal 50 is held in the concavity 24, the proximity wireless communication between the portable information terminal 50 and the proximity wireless I/F part 21 will not be realized. The proximity wireless I/F part 21 receives data transmitted from the portable information terminal 50 by proximity high-speed wireless communication, and also transmits data received from the in-vehicle apparatus 30 to the portable information terminal 50 by the proximity high-speed wireless communication.

The portable information terminal 50 is a smart phone or a tablet terminal that includes a CPU 51, a proximity wireless I/F part 52, a battery 55, a display 56 (or referred to as a screen), a touch panel 57, various switches 58, an information storage unit 59, and a notification part 60.

The proximity wireless I/F part 52 is a wireless interface that performs the proximity high-speed wireless communication such as Transfer Jet (the registered trademark). The proximity wireless I/F part 52 receives data transmitted from the proximity wireless I/F part 21 by the proximity high-speed wireless communication and also transmits data received from the CPU 51 to the proximity wireless I/F part 21 by the proximity high-speed wireless communication. The proximity wireless I/F part 52 and the proximity wireless I/F part 21 perform transmission and reception of data without establishing connection by physical contact. The portable information terminal 50 also includes a wireless I/F part (unshown) that performs wireless communication such as Wi-Fi (a registered trademark) and Bluetooth (a registered trademark).

The battery 55 accumulates electric power to be supplied to the CPU 51. The display 56 is constructed with a liquid crystal display or an organic EL (Electro Luminescence) display. The touch panel 57 constitutes a touch switch being integrated with the display 56. The various switches 58 are mechanical switches such as a power source switch. The notification part 60 is integrated with the display 56 and performs display of notifying establishment of connection on the display 56. Alternatively, the notification part 60 is a speaker and notifies the user of the establishment of connection with voice.

The information storage unit 59 stores: a program that restricts executable applications of the portable information terminal 50 to applications for vehicle that the vehicle manufacturer certified; various applications for vehicle; various general applications; and data of the various in-vehicle instruments transmitted from the in-vehicle apparatus 30. The above-mentioned program and various applications for vehicle have been downloaded in advance from a server to the portable information terminal 50. Alternatively, the above-mentioned program and the various applications for vehicle may be stored in the information storage unit 15 of the in-vehicle apparatus 30, and may be downloaded from the in-vehicle apparatus 30 to the portable information terminal 50 when the proximity wireless communication between the portable information terminal 50 and the in-vehicle apparatus 30 is established. Moreover, the above-mentioned program and the various applications for vehicle may be stored in a program storage medium, and may be downloaded from the program storage medium to the portable information terminal 50.

The CPU 51 executes the above-mentioned program to thereby restrict executable applications to the applications for vehicle on condition that the portable information terminal 50 is held in the concavity 24 and is performing the proximity wireless communication with the proximity wireless I/F part 21. A processing procedure that restricts the executable applications of the portable information terminal 50 will be described later.

A manipulation menu of the target in-vehicle instrument is displayed on the display 56 by the CPU 51 performing an application that manipulates the target in-vehicle instrument. For example, when the target in-vehicle instrument is the air-conditioner, a control panel of the air-conditioner is displayed on the display 56. Then, the CPU 51 transmits the control command to the in-vehicle apparatus 30 through the communication auxiliary apparatus 20 in response to manipulation of the manipulation menu by the user. Thereby, the in-vehicle instrument that is targeted is manipulated.

Vehicle information is received from the in-vehicle apparatus 30 through the communication auxiliary apparatus 20 and the received vehicle information is displayed on the display 56 by the CPU 51 performing an application of displaying the vehicle information on the display 56. For example, the vehicle speed information, the total mileage, and the maintenance information of the vehicle each are vehicle information.

Figure 4:
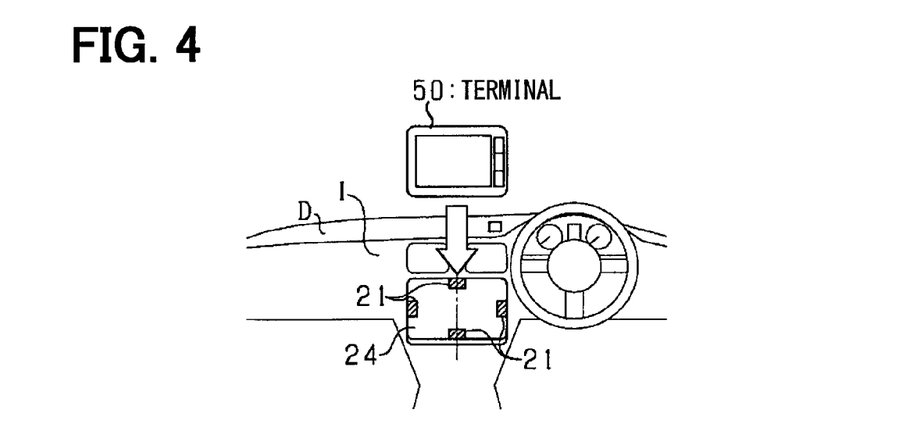
FIG. 4 is a diagram illustrating a situation of the portable information terminal held in a holding part on an instrument panel.
Figure 5:
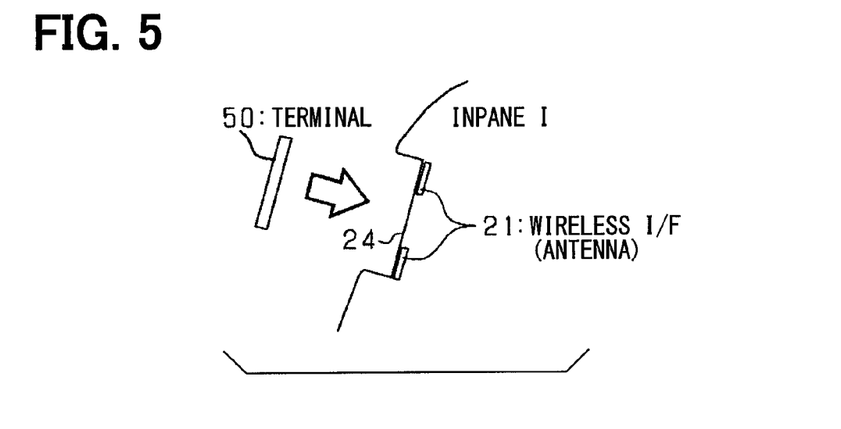
FIG. 5 is a diagram illustrating a situation of the portable information terminal held in the holding part on the instrument panel.
Figure 6:
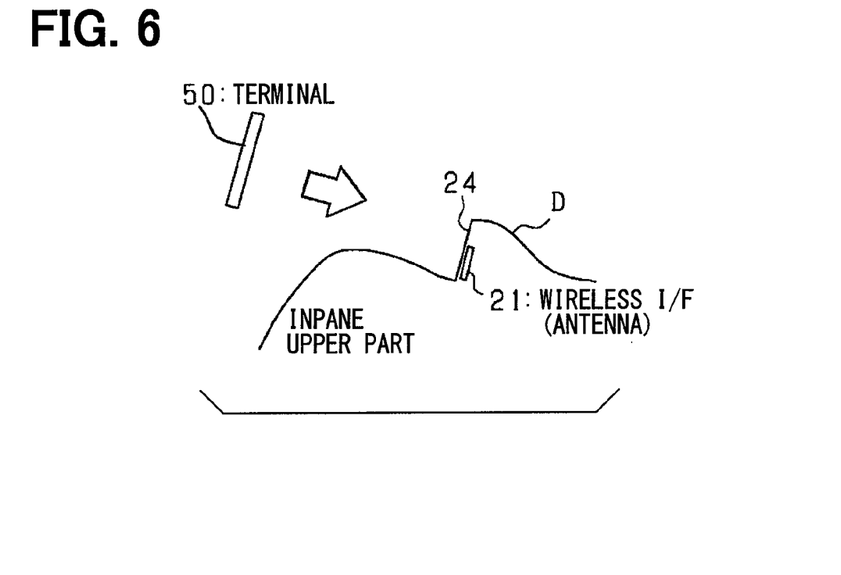
FIG. 6 is a diagram illustrating a situation of the portable information terminal held in a holding part on a dashboard.

Referring to FIGS. 4 to 6, the following explains a place in the vehicle compartment mounted with the communication auxiliary apparatus 20, i.e., a place where the portable information terminal 50 is held, and a method of holding the portable information terminal 50.

Using the portable information terminal 50 in a state suitable for manipulation in the vehicle compartment needs holding of the portable information terminal 50 in a suitable place that a driver can easily recognize and, simultaneously, continuous proximity wireless communication.

The portable information terminal 50 is used to be fixed on an instrument panel I of the vehicle as in FIGS. 4 and 5. The concavity 24 rectangular in cross-sectional shape that holds the portable information terminal 50 is formed on the instrument panel I. The concavity 24 is formed with geometries corresponding to those of the portable information terminal 50. The proximity wireless I/F part 21 is disposed in the proximity of this concavity 24. Specifically, the proximity wireless I/F part 21 is disposed in the center of at least one side of a bottom of the concavity 24 formed into a rectangular cross-sectional shape.

The user sets up the portable information terminal 50 shaped of a rectangular plate in the concavity 24, so as to align to each other (i) a position of the proximity wireless I/F part 21 installed in the center of at least one side of the concavity 24 and (ii) a position of the proximity wireless I/F part 52 that is built in the portable information terminal 50. This allows the portable information terminal 50 to be fixed in a place that the driver can easily recognize in a moving vehicle, and permits the continuous proximity wireless communication between the portable information terminal 50 and the in-vehicle apparatus 30.

As in FIG. 6, the portable information terminal 50 may be fixed on a dashboard D that is easy for the driver to visually check. In this case, the concavity 24 is formed on the dashboard D, and the proximity wireless I/F part 21 is installed in the proximity of the concavity 24. The user sets up the portable information terminal 50 in the concavity 24 so as to align to each other (i) the position of the proximity wireless I/F part 21 installed in the proximity of the concavity 24 and (ii) the position of the proximity wireless I/F part 52 built in the portable information terminal 50. The portable information terminal 50 is fixed in the concavity 24 so that the proximity wireless I/F part 52 built in the portable information terminal 50 may come to be at the low end of the portable information terminal 50 even when the depth of the concavity 24 on the dashboard D is shallower than the length of a short side of the portable information terminal 50 (the height in the installed state). This enables continuous proximity high-speed wireless communication between the portable information terminal 50 and the in-vehicle apparatus 30. The concavity 24 should just be formed on at least either the instrument panel I or the dashboard D.

Figure 7:
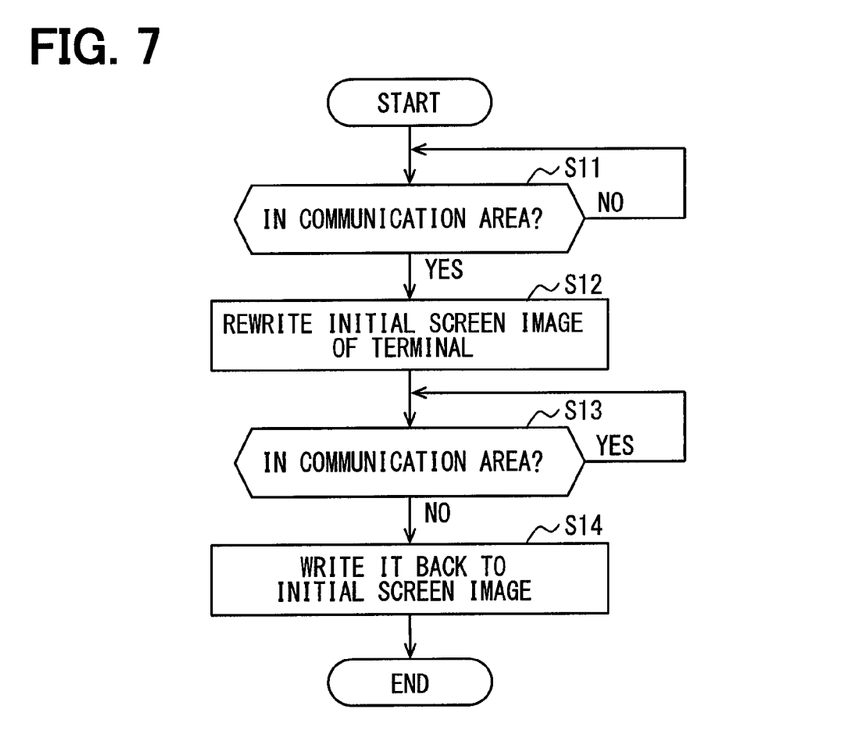
FIG. 7 is a flowchart illustrating a processing procedure restricting executable applications of the portable information terminal.

A processing procedure of restricting the executable applications of the portable information terminal 50 will be explained, referring to FIG. 7. The CPU 51 of the portable information terminal 50 performs this processing by executing a program that restricts the executable applications to the predetermined applications.

In S11, it is determined whether the portable information terminal 50 is in a communication area of the proximity wireless I/F part 21. For example, when intensity at which electric wave transmitted from the proximity wireless I/F part 21 is received by the proximity wireless I/F part 52 built in the portable information terminal 50 exceeds a predetermined value, it is determined that the portable information terminal 50 is in the communication area. When not being in the communication area (NO), processing of S11 is executed repeatedly. When being in the communication area (YES), the flow proceeds to processing of S12.

In S12, an initial screen image of the portable information terminal 50 is rewritten to a different one, and the executable applications of the portable information terminal 50 are restricted to the predetermined applications. In an initial screen image before the executable applications are restricted, applications other than the predetermined applications and a navigation bar are displayed. When the applications other than the predetermined applications and the navigation bar are kept displayed in the initial screen image, the user might execute an application other than the predetermined applications. Unnecessary contents, such as the applications other than the predetermined applications and the navigation bar, are therefore deleted from the initial screen image of the portable information terminal 50, and only the predetermined applications are displayed in the rewritten initial screen image.

In S13, it is determined whether the portable information terminal 50 is in the communication area of the proximity wireless I/F part 21. When being in the communication area (YES), processing of S13 is executed repeatedly. At this time, an application for vehicle is executed according to the user's manipulation. In contrast, when not being in the communication area (NO), the flow proceeds to processing of S14.

In S14, restriction of the executable applications is ended and the initial screen image of the portable information terminal 50 is written back to the initial screen image before the processing of S12 is performed. That is, the navigation bar and the applications other than the predetermined applications are displayed in the initial screen image. After the above-mentioned procedures, this processing ends.

According to the first embodiment explained above, the following effect is produced.

In the vehicle compartment, the concavity 24 is provided which can hold the portable information terminal 50 and enable the proximity wireless communication between (i) the portable information terminal 50 held in the concavity 24 and (ii) the proximity wireless I/F part 21. Then, when the portable information terminal 50 is held in the concavity 24 and is performing the proximity wireless communication with the proximity wireless I/F part 21, the executable applications are restricted to the predetermined applications. Therefore, only when the portable information terminal 50 is held in the concavity 24, stable one-to-one proximity wireless communication is realized between (i) the portable information terminal 50 whose executable applications are restricted and (ii) the in-vehicle apparatus 30. Accordingly, the portable information terminal 50 can be made into a use status suitable for manipulation in the vehicle, while inhibiting the driver from distracting the attention. Furthermore, the portable information terminal 50 and the in-vehicle apparatus 30 are connected with each other by the proximity wireless communication, unlike cases where the both are connected with each other either by wireless communication other than the proximity wireless communication or by cable communication. This prevents the use of the portable information terminal 50 in any place other than a predetermined holding part, eliminating a risk of the driver distraction.

The portable information terminal 50 is fixed at a position in the vehicle that the driver can easily recognize by holding the portable information terminal 50 in the concavity 24 formed on at least either the instrument panel I or the dashboard D of the vehicle. This enables to inhibit the driver from distracting the attention. Furthermore, the proximity wireless I/F part 21 is installed in the proximity of the concavity 24, permitting communication between the portable information terminal 50 held in the concavity 24 and the proximity wireless I/F part 21 surely even by the proximity wireless communication that uses the induction field mode whose communication area is narrow.

Even when the portable information terminal 50 is held in the concavity 24 and is performing the proximity wireless communication with the proximity wireless I/F part 21, the various in-vehicle instruments mounted on the vehicle can be manipulated by executing the predetermined application for vehicle. Moreover, even if manipulation of the various in-vehicle instruments is enabled, a risk of distracting the driver's attention is low.

Even when the portable information terminal 50 is held in the concavity 24 and is performing the proximity wireless communication with the proximity wireless I/F part 21, the portable information terminal 50 that is held in the concavity 24 can be used as a display unit that displays the information of the vehicle by executing the predetermined application for vehicle. Moreover, even if the information of the vehicle is displayed on the display 56 of the portable information terminal 50, a risk of distracting the driver's attention is low.

The program installed in the portable information terminal 50 is executed to restrict the executable applications of the portable information terminal 50 to the applications for vehicle when the portable information terminal 50 is held in the concavity 24 and the portable information terminal 50 is performing the proximity wireless communication with the proximity wireless I/F part 21. When the portable information terminal 50 is performing the proximity wireless communication with the proximity wireless I/F part 21, the portable information terminal 50 can therefore be set to the use status suitable for the manipulation in the vehicle.

When the portable information terminal 50 is performing the proximity wireless communication with the proximity wireless I/F part 21, the initial screen image is rewritten to a different initial screen image from an initial screen image of the case where the proximity wireless communication is not being performed, and only the executable applications are displayed in the different initial screen image. This can therefore certainly inhibit the user from executing applications other than the executable applications.

Second Embodiment

Figure 8:
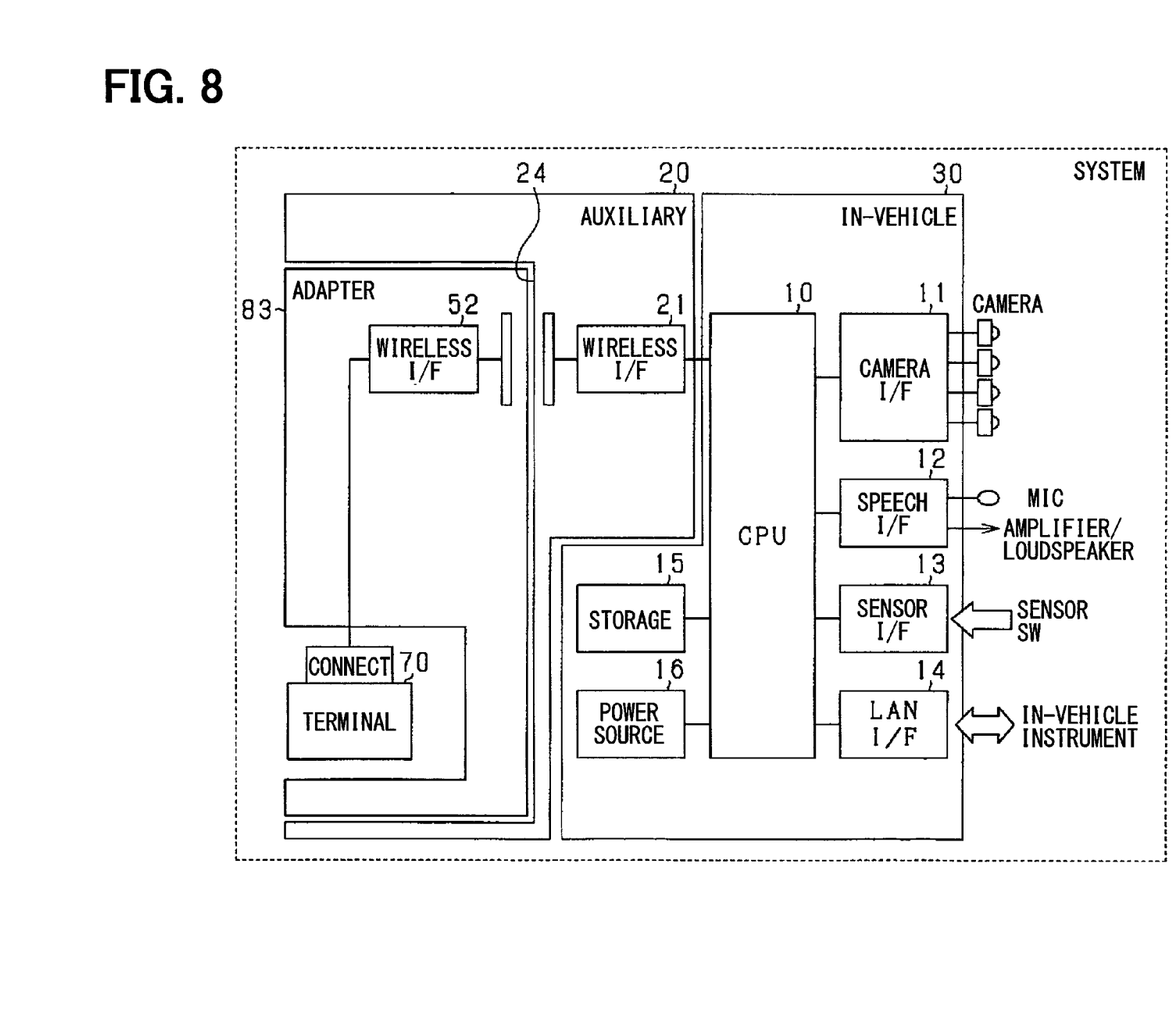
FIG. 8 is configuration diagrams of a communication auxiliary apparatus, an in-vehicle apparatus, and the portable information terminal according to a second embodiment.

A second embodiment will be explained about a point different from the first embodiment. An in-vehicle system according to the second embodiment includes the communication auxiliary apparatus 20, the in-vehicle apparatus 30, a portable information terminal 70, and a portable-terminal adapter 83. With reference to FIG. 8, configurations of the portable-terminal adapter 83 and the portable information terminal 70 will be explained.

The portable-terminal adapter 83 includes a built-in proximity wireless I/F part 52, and is formed into a shape that does not spoil portability and is portable being mounted on the portable information terminal 70 (e.g., a shape of a casing of the portable information terminal 70). When the portable-terminal adapter 83 is mounted on the portable information terminal 70, the proximity wireless I/F part 52 is connected to a connection terminal part of the portable information terminal 70.

The proximity wireless I/F part 52 receives the data transmitted from the proximity wireless I/F part 21 by the proximity wireless communication, and also transmits data received from the portable information terminal 70 to the proximity wireless I/F part 21 by the proximity wireless communication.

Figure 9:
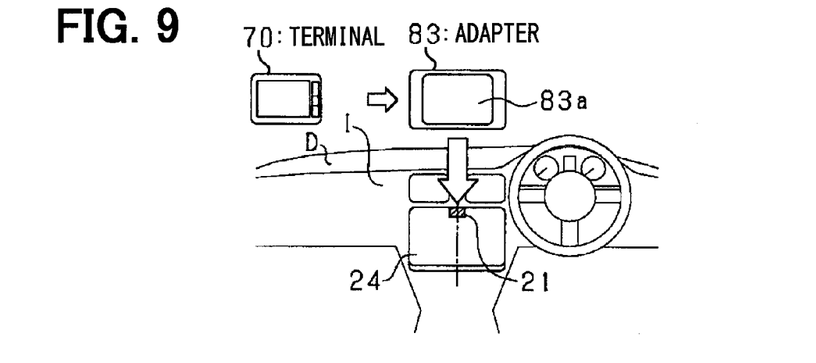
FIG. 9 is a diagram illustrating a situation of the portable information terminal connected with a portable-terminal adapter being held in the holding part on the instrument panel.
Figure 10:
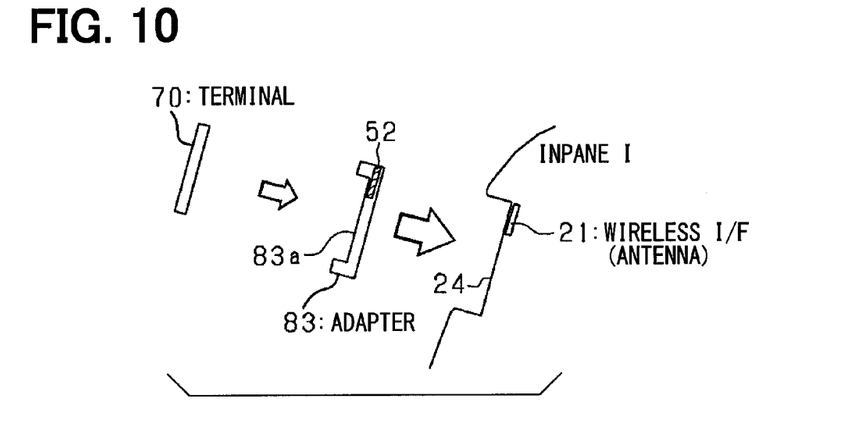
FIG. 10 is a diagram illustrating a situation of the portable information terminal connected with the portable-terminal adapter being held in the holding part on the instrument panel.
Figure 11:
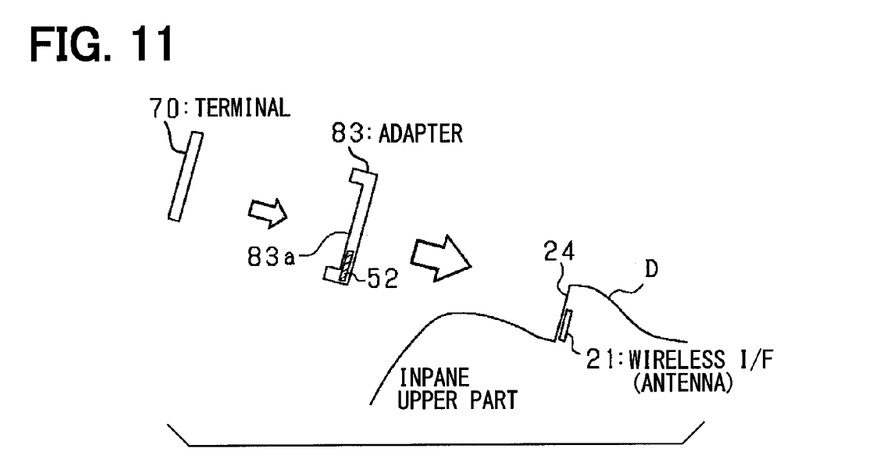
FIG. 11 is a diagram illustrating a situation of the portable information terminal connected with the portable-terminal adapter being held in the holding part on the dashboard.

Referring to FIGS. 9 to 11, the following explains a place in the vehicle compartment mounted with the communication auxiliary apparatus 20, i.e., a place holing the portable information terminal 70 attached with the portable-terminal adapter 83, and a method of holding the portable information terminal 70.

The portable information terminal 70 mounted with the portable-terminal adapter 83 should just be held on at least either the instrument panel I or the dashboard D. When holding the portable information terminal 70 mounted with the portable-terminal adapter 83 on the instrument panel I, the concavity 24 rectangular in cross-sectional shape is formed on the instrument panel I with geometries corresponding to those of the portable-terminal adapter 83 of a rectangular plate shape, as in FIGS. 9 and 10. The proximity wireless I/F part 21 is installed in the proximity of this concavity 24.

The user mounts the portable information terminal 70 on a mounting surface 83*a* of the portable-terminal adapter 83. Then, the user installs the portable information terminal 70 connected with the portable-terminal adapter 83 in the concavity 24 so that the position of the proximity wireless I/F part 21 installed in the proximity of the concavity 24 and the position of the proximity wireless I/F part 52 built in the portable-terminal adapter 83 may be aligned to each other.

When holding the portable information terminal 70 mounted with the portable-terminal adapter 83 on the dashboard D, as in FIG. 11, the concavity 24 is formed on the dashboard D. The proximity wireless I/F part 21 is installed in the proximity of this concavity 24.

The user installs the portable information terminal 70 connected with the portable-terminal adapter 83 in the concavity 24 so that the position of the proximity wireless I/F part 21 installed in the proximity of the concavity 24 and the position of the proximity wireless I/F part 52 built in the portable-terminal adapter 83 may be aligned to each other. The portable information terminal 70 connected with the portable-terminal adapter 83 is fixed in the concavity 24 so that the proximity wireless I/F part 52 built in the portable-terminal adapter 83 may come to be at the low end of the portable-terminal adapter 83 even when the depth of the concavity 24 on the dashboard D is shallower than the length (the height in an installed state) of a short side of the portable-terminal adapter 83.

According to the second embodiment explained above, the proximity wireless I/F part 52 is connected to the portable information terminal 70 by the portable-terminal adapter 83 having the proximity wireless I/F part 52. Then, the data transmitted from the proximity wireless I/F part 21 by the proximity wireless communication is received by the proximity wireless I/F part 52 connected to the portable information terminal 70. Moreover, the data received from the portable information terminal 70 by the proximity wireless I/F part 52 is transmitted to the proximity wireless I/F part 21 by the proximity high-speed wireless communication. The proximity high-speed wireless communication can therefore be performed between the portable information terminal 70 connected with the portable-terminal adapter 83 and the proximity wireless I/F part 21 even when the portable information terminal 70 does not have the proximity wireless I/F part 52 allowing the portable information terminal 70 to perform the proximity wireless communication. This provides the same effect as that of the first embodiment.

Another Embodiment

Instead of the CPU 51 of the portable information terminal 50, 70 executing the program that restricts the executable applications, the in-vehicle apparatus 30 may transmit a command that restricts the executable applications to the predetermined applications to the portable information terminal 50, 70 through the communication auxiliary apparatus 20. In details, the in-vehicle apparatus 30 transmits a command to rewrite an initial screen image to another initial screen image that displays only the predetermined applications to the portable information terminal 50, 70.

The executable applications of the portable information terminal 50, 70 are restricted when the portable information terminal 50, 70 is held in the concavity 24 and the portable information terminal 50, 70 is performing the proximity wireless communication with the proximity wireless I/F part 21. When the portable information terminal 50, 70 is performing the proximity wireless communication with the proximity wireless I/F part 21, the portable information terminal 50, 70 can therefore be set to the use status suitable for the manipulation in the vehicle. Moreover, execution of any application other than the executable applications by the user is surely inhibited.

The initial screen image of the portable information terminal 50 need not be rewritten, and operations of applications other than the applications for vehicle may be restricted. In this case, the portable information terminal 50 is not manipulated even if the user touches the display other than the applications for vehicle displayed in the initial screen image.

The portable-terminal adapter 83 may be an adapter of a shape that fills a gap between the portable information terminal 70 and the concavity 24 when the portable information terminal 70 is arranged in the concavity 24. The portable information terminal 70 of any shape can be held in the concavity 24.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A communication system, comprising:
an in-vehicle apparatus that is connected to a plurality of vehicular instruments of a vehicle and is mounted on the vehicle;
a portable information terminal capable of executing a plurality of first applications; and
a communication auxiliary apparatus assisting communication between the in-vehicle apparatus and the portable information terminal, the communication auxiliary apparatus including (i) a communication part that is connected to the in-vehicle apparatus, and is capable of receiving data transmitted from the portable information terminal by proximity wireless communication and transmitting data from the in-vehicle apparatus to the portable information terminal by the proximity wireless communication, and (ii) a holding part that is provided in a compartment of the vehicle, holds the portable information terminal, and enables the proximity wireless communication between the portable information terminal that is held and the communication part, wherein:
the portable information terminal restricts an executable application to at least one predetermined second application, the at least one predetermined second application relating to the vehicle, on condition that the portable information terminal is held in the holding part and is performing the proximity wireless communication with the communication part;
the portable information terminal displays, to execute the respective first applications, an initial screen image displaying first application images corresponding to the respective first applications on a screen of the portable information terminal, in response to determining that the portable information terminal is not performing the proximity wireless communication with the communication part; and
the in-vehicle apparatus transmits a command to the portable information terminal via the communication auxiliary apparatus, in response to determining that the portable information terminal is performing the proximity wireless communication with the communication part,
the command making the portable information terminal rewrite the initial screen image to a different screen image on the screen by
deleting, from the screen of the portable information terminal, any unnecessary application image that has been displayed in the initial screen image and is other than at least one second application image corresponding to the at least one predetermined second application to which the executable application is restricted, and
making the different screen image on the screen of the portable information terminal display only the at least one second application image corresponding to the at least one predetermined second application to which the executable application is restricted.

2. The communication system according to claim 1, wherein:
the holding part is a concavity formed on at least either an instrument panel or a dashboard of the vehicle; and
the communication part is disposed in proximity of the concavity.

3. The communication system according to claim 1, wherein
the predetermined second application manipulates one of the vehicular instruments of the vehicle.

4. The communication system according to claim 1, wherein
the predetermined second application is an application that displays information of the vehicle on the screen of the portable information terminal.

5. A program product that includes an instruction of causing the portable information terminal of the communication system according to claim 1 to function, the program product being stored in a non-transitory computer-readable medium.

6. The communication system according to claim 1, wherein the unnecessary application image, which has been displayed by occupying a displayed area in the initial screen image on the screen of the portable information terminal, is invisible in the different screen image such that the unnecessary application image occupying the displayed area in the initial screen image disappears by being deleted from the screen of the portable information terminal altogether.

7. The communication system according to claim 1, wherein the in-vehicle apparatus transmits the at least one predetermined second application whose second application image is displayed in the different screen image when transmitting the command to the portable information terminal to cause the portable information terminal to switch, on the screen, from the initial screen image into the different screen image.

8. A communication system, comprising:
an in-vehicle apparatus that is mounted in a vehicle and connected to a plurality of vehicular instruments in the vehicle;
a portable information terminal executing a plurality of first applications used in the portable information terminal; and
a communication auxiliary apparatus assisting communication between the in-vehicle apparatus and the portable information terminal, the communication auxiliary apparatus including (i) a communication part that is connected to the in-vehicle apparatus, and is capable of receiving data transmitted from the portable information terminal by proximity wireless communication and transmitting data from the in-vehicle apparatus to the portable information terminal by the proximity wireless communication, and (ii) a holding part that is provided in a compartment of the vehicle, holds the portable information terminal, and enables the proximity wireless communication between the portable information terminal that is held and the communication part,
wherein:
the portable information terminal is enabled to execute second applications that are different from the first applications, the second applications relating to the respective vehicular instruments in the vehicle, on condition that the portable information terminal is held in the holding part and is performing the proximity wireless communication with the communication part;
the portable information terminal displays, to execute the respective first applications used in the portable information terminal, a first screen image that is an initial screen image displaying first application images corresponding to the respective first applications by accommodating the first application images on a screen of the portable information terminal, in response to determining that the portable information terminal is not performing the proximity wireless communication with the communication part; and
the in-vehicle apparatus transmits a command to the portable information terminal via the communication auxiliary apparatus to make the portable information terminal execute the second applications relating to the respective vehicular instruments, in response to determining that the portable information terminal is performing the proximity wireless communication with the communication part,
the command making the portable information terminal switch, on the screen of the portable information terminal, from the first screen image into a second screen image,
the second screen image displaying only second application images corresponding to the second applications respectively relating to the vehicular instruments such that the first applications having been accommodated in the first screen image disappear by being deleted from the screen of the portable information terminal.

9. The communication system according to claim 8, wherein
the in-vehicle apparatus transmits the second applications whose second application images are displayed in the second screen image when transmitting the command to the portable information terminal to cause the portable information terminal to switch, on the screen, from the first screen image into the second screen image.

10. The communication system according to claim 8, wherein:
the holding part is a concavity formed on at least either an instrument panel or a dashboard of the vehicle; and
the communication part is disposed in proximity of the concavity.

11. The communication system according to claim 8, wherein the second applications operate the respective vehicular instruments in the vehicle.

12. The communication system according to claim 8, wherein the second applications display information of the respective vehicular instruments in the vehicle on the screen of the portable information terminal.

* * * * *